United States Patent
Bevan et al.

[15] 3,644,171
[45] Feb. 22, 1972

[54] PROCESS FOR PREPARING A WOOD CHIP PILE FOR DIGESTION BY COATING THE PILE WITH A GAS IMPERMEABLE LAYER AND PRODUCTS THEREOF

[72] Inventors: Rhys Dilwyn Bevan, 245 Springhill Road, Rosemore, Quebec, Canada; Ingemar Liss-Albin Croon, S. Aspgatan 1, Alfredshem, Ornskoldsvik, Sweden

[22] Filed: July 7, 1969

[21] Appl. No.: 839,674

[30] Foreign Application Priority Data

July 12, 1968  Great Britain......................33,275/68

[52] U.S. Cl..................................162/70, 21/7, 21/60.5, 117/100 A, 117/148, 117/150, 162/79, 162/82, 162/83, 162/90
[51] Int. Cl..........................................................D21c 3/04
[58] Field of Search........................162/1, 70, 79, 82, 83, 96; 21/7, 60.5; 117/100 A, 148, 150; 106/209

[56] References Cited

UNITED STATES PATENTS 3,036,949  5/1962  Cha........................................162/96 X
3,431,061  3/1969  Chase et al..............................21/7 X

*Primary Examiner*—S. Leon Bashore
*Assistant Examiner*—Arthur L. Corbin
*Attorney*—Bernard F. Roussin

[57] ABSTRACT

Wood chips, at least 1 percent of which, by volume are impregnated with a cooking liquor are cooked while stored in the form of a pile. The pile is characterized by being coated, except for a limited area at the top, with a gas impermeable layer of a foamed resin or of an admixture of a wood derivative selected from saw dust, kraft pulp or screenings and sulphite pulp screenings with a binding agent which can be cross-linked to form a gel. The coating facilitates the control of the temperature and the circulation of air in the pile.

7 Claims, No Drawings

PROCESS FOR PREPARING A WOOD CHIP PILE FOR DIGESTION BY COATING THE PILE WITH A GAS IMPERMEABLE LAYER AND PRODUCTS THEREOF

This invention relates to a system for preparing wood chips for digesters and, more particularly, to a process for treating wood chips while the latter are stored in the form of a pile.

It is a generalizing practice in the pulp and paper industry to transform the wood reserve into chips and to store it in the form of chip piles. The storage period often extends over several months during which the wood is altered by reason of prolonged exposure to air and ambient atmospheric conditions as well as to the action of micro-organisms.

It has always been the wish of those versed in the pulping art to find a process which would make it possible to at least partially cook the wood during its period of storage and while in a pile form.

A principal object of this invention is to fulfill this wish and to provide a process for partially cooking wood while it is stored in the form of a novel type of wood chip pile.

The novel wood chip pile of the invention comprises, in combination, a pile of wood chips at least part of which are impregnated with a cooking liquor and, completely surrounding said pile except for a limited area at the top thereof, a gas impermeable layer of a foamed resin or of a material which is easily sprayed or applied and which hydrolyzes or is otherwise destroyed or utilized upon cooking of the wood so that the quality of the pulp made from the wood chip pile is not affected thereby.

Foamed resins suitable for use in accordance with the invention are, for example, polyurethane foams and epoxy foams. Suitable materials of the other type above defined are admixtures of wood derivatives such as saw dust, draft pulp or screenings, and sulphite pulp or screenings with a binding agent which can be cross-linked to form a gel. Examples of such binding agents are guar gum, carboxy methyl cellulose and concentrated waste sulphite liquor.

It can be readily seen that with the above-described novel wood chip pile, penetration of air from the exterior into the pile is prevented and the conditions of temperature within the pile can be easily maintained or controlled by some artificial means such as a heating system placed under the pile.

It is this above-described advantage of the novel wood chip pile which makes it possible to cook wood chip piles in accordance with the process of the invention.

Broadly speaking, the process in accordance with the invention comprises forming a pile from wood chips at least a part of which are impregnated with a liquor, coating the pile except for a limited area at the top thereof with a gas impermeable layer of foam or other suitable substance as hereinbefore defined, allowing the temperature within the pile to rise to within the range 5° to 95° C. and maintaining the temperature within said range until the desired degree of cooking has been attained.

Woods of any of the species generally used in the pulp and paper industry may be treated in accordance with the process of the invention. It is, however, essential that such woods be in the form of chips. Any conventional log chipper may be used for the preparation of chips suitable for use in the process of the invention.

The liquor for impregnating the chips in accordance with the first step of the process is preferably caustic soda, mill white or green liquor, or a combination of caustic soda with either sodium sulphide or polysulphide. It can also be a sulphite liquor.

The proportion of impregnated chips to untreated chips in the pile may vary from 1 to 100 percent by volume, preferably from 15 to 100 percent by volume.

It should be understood that the term "wood chips" as used throughout the specification is meant to include chips which may have been previously treated with preservatives such as antidecay agents, antistain agents, fungicides, etc. It has been found advantageous, for instance, to use as untreated chips, wood chips which have been surface coated with a nickel salt selected from the chloride, sulphate, nitrate, carbonate and bicarbonate salts of bivalent nickel. The nickel salt deposited on the wood chips has the property of controlling the micro-organisms which decompose liqnocellulosic materials and are slime producing, without inhibiting such micro-organisms which decompose the extract materials of the liqnocellulosic product.

The gas impermeable layer may be applied to the pile by any conventional procedure.

Once the pile has been formed and coated with the gas impermeable layer, it may be allowed to stand for as long a period as desired, during which the wood is preserved by virtue of air being prevented from penetrating into the pile. When it is decided that the time has come to prepare the wood in the pile for digestion, the temperature in the pile is allowed to rise to within 5° to 95° C., preferably 30° to 60° C. Such rise is generally brought about by artificial heating. It will be readily apparent that, in the process of the present invention, the layer of foam or other substance around the pile makes it easier to maintain optimum temperature within the pile.

In order to bring about the rise of temperature in the pile, a heating system, for instance, is provided at the bottom of the chip pile whereby the temperature rise within the pile can be initiated whenever desired. The heating procedure described in Canadian Pat. No. 770,910 issued on Nov. 7, 1967 to I. L. Croon et al. has been found very satisfactory for this purpose. The local supply of heat at the bottom of the chip pile can be achieved in various ways, such as by means of hot gas, e.g., air and steam, or electrical heating elements or the like. Emission of air or other gas from the pile occurs through the limited area which is left uncoated at the top of the pile.

Once the temperature within the pile has reached the level of 5° to 95° C., cooking of the impregnated chips of the pile starts and the temperature is maintained at this level until the desired degree of preparation for cooking in a digester has been reached.

After the wood chips have reached the desired degree of preparation, they are removed from the pile and processed to final product by conventional pulp and paper manufacturing procedures.

Another important advantage of the process of the invention is that the chips which have been treated in accordance with the invention prior to digestion cook to a lower kappa number in a shorter period of time without seriously affecting pulp quality.

The following examples are intended to illustrate the invention and not to limit it in any way. Parts are by weight unless otherwise specified.

EXAMPLE 1

A 6-foot high conical pile of wood chips was coated with a standard urethane plastic foam using Gusmer airless spray equipment. The foam bonded strongly to the chips and complete coverage was achieved with a foam ranging in thickness from 0.75 to 1.5 inch. The 1.5-inch thickness included some wood chips.

The impermeable foam coating thus obtained was found very useful in reducing deterioration of chips on storage and in allowing uniform cooking in a chemically treated chip pile by protecting the pile from weathering and by controlling the flow of moisture, air and heat into or away from the pile. As, however, the urethane foam could not be digested, it had to be broken down and removed from the chip pile prior to pulping.

EXAMPLE 2

A coating mixture was prepared from the following ingredients:

|  | Parts |
| --- | --- |
| Unbleached kraft pulp (4% consistency) | 100 |
| Guar gum in form of flour |  |

| | |
|---|---|
| (Jaguar* MDC) | 0.8 |
| Cross-linker (C-20) | 0.04 |
| Dowicide* G (sodium pentachlorophenate) | 0.01 |

*Registered trademarks

The type of guar used was a standard form which hydrates rapidly to give a viscous solution. Other types are available which hydrate more slowly.

The cross-linker used was one developed by Stein-Hall and Company and sold under the name C-20. Its exact chemical composition is not known, but it is believed to comprise antimonates and chromates which are the basis of most commercial cross-linkers.

The mixture was prepared by placing in a reactor the 4 percent pulp slurry containing "Dowicide" G and having a pH of 5.0 to 5.5 and by stirring rapidly. The dry guar gum and C-20, previously well mixed, were sprinkled onto the moving pulp while the temperature was maintained at 20°-25° C. It was found necessary to add the mixture of guar and C-20 within 0.5 to 1 minute in order to avoid formation of lumps of undispersed guar.

The resulting guar-pulp mixture which was quite viscous, although pumpable, was applied to a chip pile with a spatula to form a coating of approximately 0.62-inch thickness. A special spraying equipment could have been used to apply the mixture.

Dried guar-pulp coatings resulting from the above mixture were impermeable to air and were particularly advantageous in that they were broken down into pulp in the course of the cooking. This type of coating did not result in any mechanical difficulties in the cooking process.

What we claim is:

1. A wood chip pile comprising, in combination, a pile of wood chips at least 1 percent of which, by volume are impregnated with a cooking liquor and, completely surrounding said pile except for an area at the top allowing emission of air or other gases from the pile, a gas impermeable layer of an admixture of a wood derivative selected from saw dust, kraft pulp or screenings and sulphite pulp or screenings with a binding agent which can be cross-linked to form a gel.

2. A wood chip pile as claimed in claim 1 wherein the binding agent is selected from guar gum, carboxymethyl cellulose and concentrated waste sulphite liquor.

3. A wood chip pile as claimed in claim 1 wherein the admixture is one of kraft pulp with guar gum.

4. A wood chip pile as claimed in claim 1 wherein the wood chips are chips which have been coated with a nickel salt selected from the chloride, sulphate, nitrate, carbonate and bicarbonate salts of bivalent nickel.

5. A process for cooking wood chips comprising forming a pile from wood chips at least 1 percent of which, by volume, are impregnated with a cooking liquor, coating the pile except for an area at the top through which air or other gases are permitted to escape from the pile, with a gas impermeable layer of an admixture of a wood derivative selected from saw dust, kraft pulp or screenings and sulphite pulp or screenings with a binding agent cross-linkable to form a gel, allowing the temperature within the pile to rise to within the range of 5° to 95° C., and maintaining the temperature within said range until the desired degree of cooking has been attained.

6. A process as claimed in claim 5 wherein the binding agent is selected from guar gum, carboxymethyl cellulose and concentrated waste sulphite liquor.

7. A process as claimed in claim 5 wherein the admixture is made of kraft pulp and guar gum.

* * * * *